(12) United States Patent
Ishimatsu et al.

(10) Patent No.: US 11,279,069 B2
(45) Date of Patent: Mar. 22, 2022

(54) MANUFACTURING METHOD OF STACKED CORE

(71) Applicant: Mitsui High-tec, Inc., Kitakyushu (JP)

(72) Inventors: Hisatomo Ishimatsu, Kitakyushu (JP); Shuhei Kotani, Kitakyushu (JP); Hirotoshi Mabu, Kitakyushu (JP); Tomoyoshi Ichimaru, Kitakyushu (JP)

(*) Notice: Subject to any disclaimer, the term of this patent is extended or adjusted under 35 U.S.C. 154(b) by 404 days.

(21) Appl. No.: 16/132,026

(22) Filed: Sep. 14, 2018

(65) Prior Publication Data

US 2019/0089231 A1    Mar. 21, 2019

(30) Foreign Application Priority Data

Sep. 19, 2017    (JP) .............................. JP2017-178768

(51) Int. Cl.
*B29C 45/76*     (2006.01)
*G05B 19/12*     (2006.01)
(Continued)

(52) U.S. Cl.
CPC ............ *B29C 45/766* (2013.01); *B29C 45/02* (2013.01); *B29C 45/14344* (2013.01); *G06K 19/06028* (2013.01); *G06K 19/06037* (2013.01); *H01F 41/005* (2013.01); *H01F 41/0233* (2013.01); *H02K 15/10* (2013.01); *H02K 15/12* (2013.01); *B29C 45/14467* (2013.01); *B29C 45/14639* (2013.01); *B29C 45/14778* (2013.01); *B29C 2045/1454* (2013.01); *B29C 2045/14852* (2013.01); *B29C 2045/14877* (2013.01); *B29C 2045/14967* (2013.01);
(Continued)

(58) Field of Classification Search
CPC .............................. B29C 45/766; H02K 15/12
See application file for complete search history.

(56) References Cited

U.S. PATENT DOCUMENTS

2008/0276446 A1    11/2008    Amano et al.
2010/0282854 A1    11/2010    Kitamura
(Continued)

FOREIGN PATENT DOCUMENTS

CN    101821632    9/2010
CN    102170201    8/2011
(Continued)

OTHER PUBLICATIONS

Extended Search Report in corresponding European Application No. 18195144.3, dated Feb. 5, 2019.

*Primary Examiner* — Benjamin A Schiffman
(74) *Attorney, Agent, or Firm* — Soei Patent & Law Firm

(57) ABSTRACT

The manufacturing method of a motor core includes attaching an ID code to a stack of blanked members in which a magnet insertion hole to fill with a resin material is formed, the ID code containing information in accordance with a type of the stack, reading the information from the ID code which is attached to the stack, and setting a mold condition based on the information read from the ID code. The mold condition includes at least one type of condition including: the resin material to be injected to the magnet insertion hole, an injection amount of the resin material, and a discharge position of the resin material. A mold device is controlled to inject the resin material to the magnet insertion hole in accordance with the mold condition.

9 Claims, 11 Drawing Sheets

(51) Int. Cl.

| | | |
|---|---|---|
| *H02K 15/12* | (2006.01) | |
| *G06K 19/06* | (2006.01) | |
| *B29C 45/14* | (2006.01) | |
| *H01F 41/02* | (2006.01) | |
| *B29C 45/02* | (2006.01) | |
| *H01F 41/00* | (2006.01) | |
| *H02K 15/10* | (2006.01) | |
| *H02K 15/03* | (2006.01) | |
| *H02K 1/276* | (2022.01) | |
| *H02K 1/28* | (2006.01) | |
| *H02K 11/35* | (2016.01) | |
| *B29L 31/00* | (2006.01) | |
| *B29K 705/12* | (2006.01) | |
| *H02K 1/27* | (2022.01) | |

(52) U.S. Cl.
CPC ............ *B29C 2945/76732* (2013.01); *B29C 2945/76913* (2013.01); *B29K 2705/12* (2013.01); *B29K 2995/0008* (2013.01); *B29L 2031/7498* (2013.01); *G05B 19/128* (2013.01); *H02K 1/27* (2013.01); *H02K 1/276* (2013.01); *H02K 1/28* (2013.01); *H02K 11/35* (2016.01); *H02K 15/03* (2013.01)

(56) References Cited

U.S. PATENT DOCUMENTS

| | | | |
|---|---|---|---|
| 2012/0135096 A1 | 5/2012 | Maeyama et al. | |
| 2013/0309341 A1 | 11/2013 | Kato et al. | |
| 2018/0336374 A1 | 11/2018 | Oda et al. | |
| 2019/0089229 A1* | 3/2019 | Sameshima | H02K 15/03 |

FOREIGN PATENT DOCUMENTS

| | | |
|---|---|---|
| CN | 102543773 | 7/2012 |
| CN | 103477540 | 12/2013 |
| DE | 102004050290 | 4/2006 |
| EP | 0417305 | 3/1991 |
| EP | 2600509 | 6/2013 |
| JP | H3-225278 | 10/1991 |
| JP | 2004-055573 | 2/2004 |
| JP | 2004-301671 | 10/2004 |
| JP | 2008-042967 | 2/2008 |
| JP | 2009-268306 | 11/2009 |
| JP | 2012-114285 | 6/2012 |
| JP | 2012-223039 | 11/2012 |
| JP | 2015-039296 | 2/2015 |
| JP | 2018-180777 | 11/2018 |
| JP | 2018-192505 | 12/2018 |
| WO | 2012/108340 | 8/2012 |

* cited by examiner

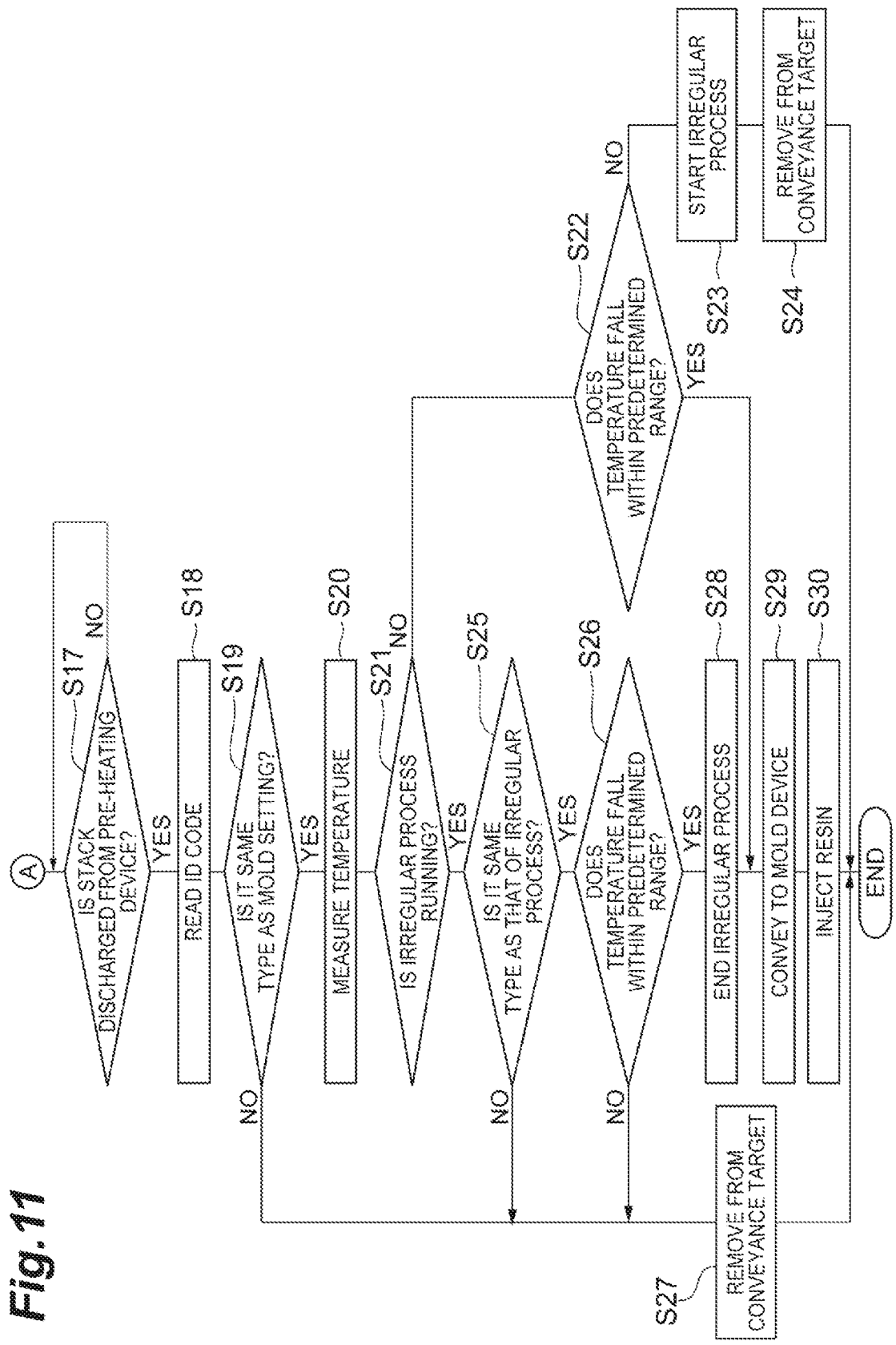

MANUFACTURING METHOD OF STACKED CORE

CROSS-REFERENCE TO RELATED APPLICATIONS

This application is based upon and claims the benefit of priority from Japanese Patent Application No. 2017-178768, filed Sep. 19, 2017, the entire contents of which are incorporated herein by reference.

BACKGROUND

1. Field

The present disclosure relates to a manufacturing method of a stacked core and a manufacturing device of the stacked core.

2. Disclosure of the Related Art

Japanese Unexamined Patent Publication No. 2015-039296 discloses a resin filling device. The resin filling device includes a resin feeding mold which feeds a melt resin to a resin inserting hole provided in a stacked core. The resin feeding mold includes a gate plate where the stacked core is mounted, and a mold body. In the gate plate, there is provided a discharge port which is disposed to face an opening of the resin inserting hole. In the mold body, there is provided a feeding mechanism which feeds a melt resin toward the discharge port. When the gate plate with the stacked core mounted on is connected to the mold body, a flow passage of the melt resin is formed from the feeding mechanism up to the resin inserting hole of the stacked core.

SUMMARY

A manufacturing method of a stacked core according to an aspect of the present disclosure includes attaching an information storage portion to a stack of electrical steel sheets in which a resin filling hole to fill with a resin material is formed, the information storage portion containing information in accordance with a type of the stack. Additionally, the manufacturing method may include reading the information from the information storage portion attached to the stack, and setting a mold condition based on the information read from the information storage portion. The mold condition includes at least one of a type of the resin material to be injected to the resin filling hole, an injection amount of the resin material, and a discharge position of the resin material. The manufacturing method may further include controlling a mold device to inject the resin material to the resin filling hole in accordance with the mold condition.

A manufacturing device of a stacked core according to another aspect of the present disclosure includes a marking device configured to attach an information storage portion to a stack of electrical steel sheets in which a resin filling hole to fill with a resin material is formed, the information storage portion containing information in accordance with a type of the stack. The manufacturing device may further include a reading device configured to read out the information from the information storage portion attached to the stack, a mold device configured to inject the resin material to the resin filling hole, and a control module configured to control the mold device. The control module is configured to set a mold condition based on the information read from the reading device, the mold condition including at least one of a type of the resin material to be injected to the resin filling hole, an injection amount of the resin material, and a discharge position of the resin material. Additionally, the control module may be configured to control a mold device to inject the resin material to the resin filling hole in accordance with the mold condition.

BRIEF DESCRIPTION OF THE DRAWINGS

FIG. 11 is another flowchart illustrating the process of filling with resin.

DETAILED DESCRIPTION

In the following description, with reference to the drawings, the same reference numbers are assigned to the same components or to similar components having the same function, and overlapping description is omitted.

(Configurations of Motor Core)

Figure 1:
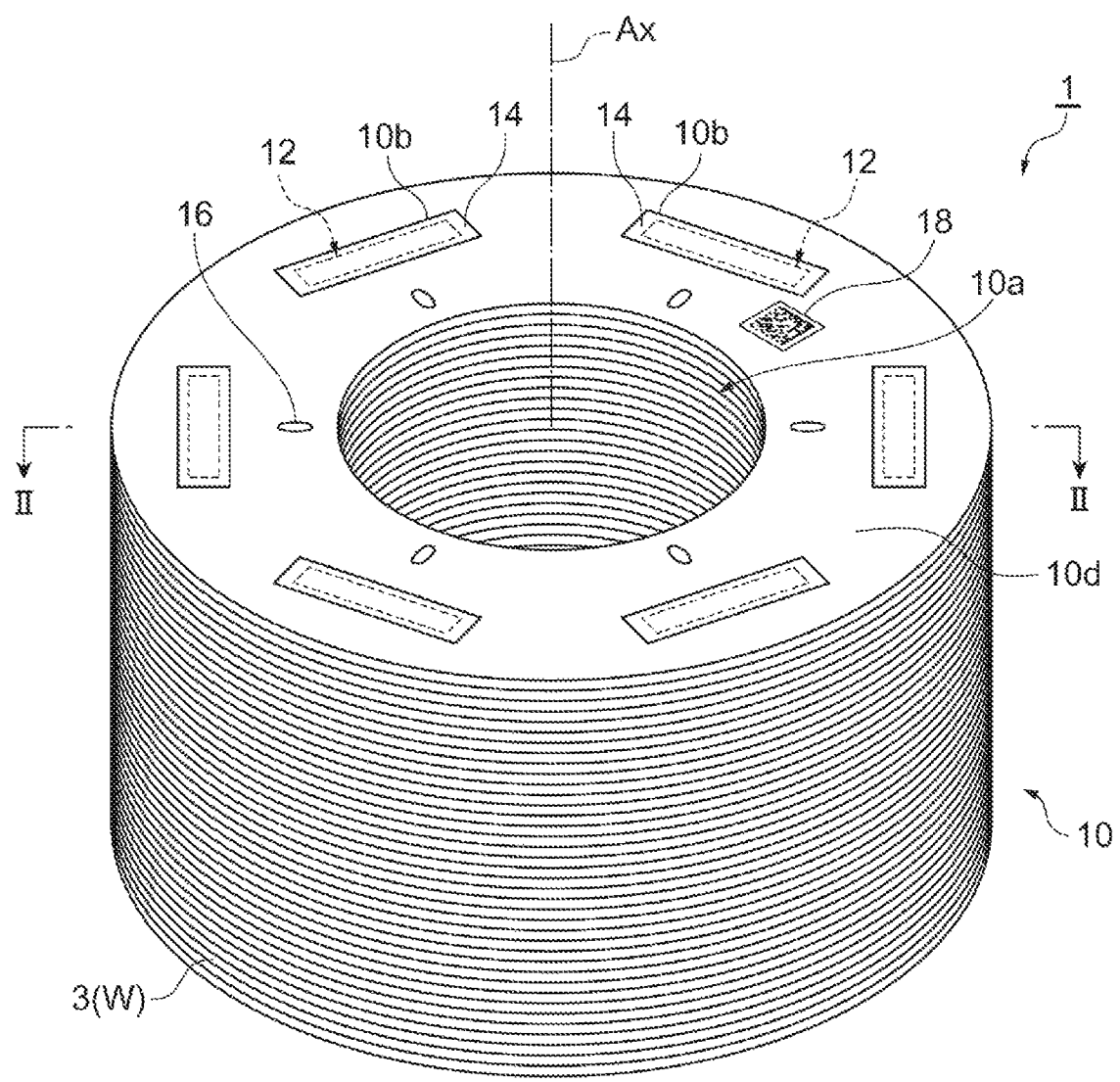
FIG. 1 is a perspective view illustrating an example motor core to which a manufacturing device of a stacked core is applied.
Figure 2:
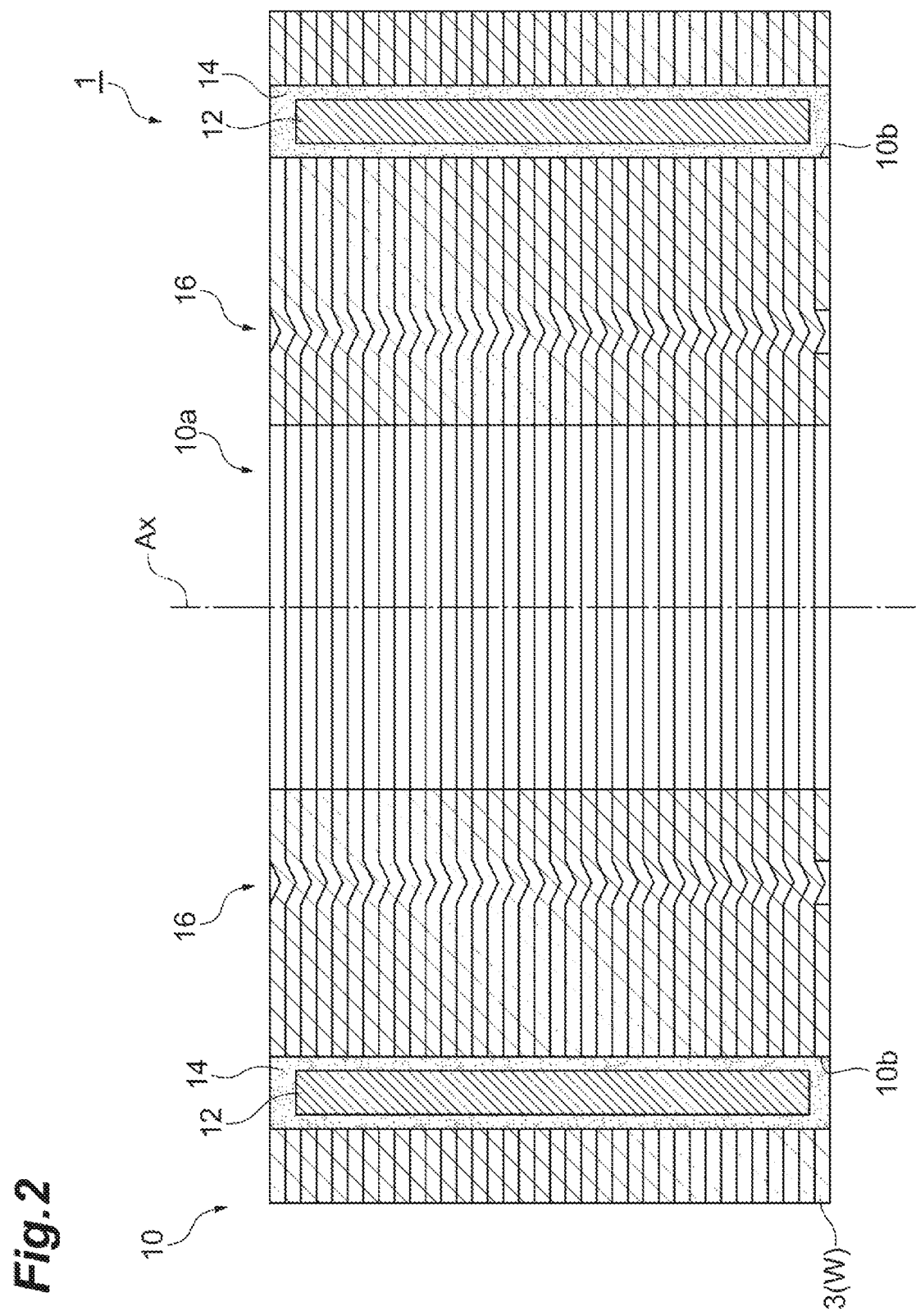
FIG. 2 is a cross-sectional view taken along line II-II in FIG. 1.

First, an example configuration of a motor core 1 (stacked core) will be described with reference to FIGS. 1 and 2. The motor core 1 is a core for a rotor of a motor (electric motor). The rotor is configured such that end plates and a shaft (both are not illustrated) are attached to the motor core 1. As illustrated in FIG. 1, the motor core 1 includes a stack 10, a plurality of permanent magnets 12, a plurality of resin materials 14, a swaged portion 16, and an ID code 18 (information storage portion).

The stack 10 is formed in a cylindrical shape. In the center portion of the stack 10, there is provided an axial hole 10a which extends along a central axis Ax of the stack 10 and passes through the stack 10. The shaft passes through the axial hole 10a.

The stack 10 includes a plurality of blanked members 3 which are stacked on each other along the central axis Ax. The blanked member 3 is a plate-like body which is formed by blanking an electrical steel sheet W in a predetermined shape. In other words, the stack 10 is a stack of the electrical steel sheets W. The blanked member 3 has a shape corresponding to the stack 10.

In the stack 10, there is formed a magnet insertion hole 10b (resin filling hole) in which the permanent magnet 12 is inserted and the resin material 14 is filled. As illustrated in FIG. 1, in the stack 10, there are formed a plurality (for example, six) of magnet insertion holes 10b. The plurality of magnet insertion holes 10b are arranged in a predetermined interval along an outer peripheral edge of the stack 10. The magnet insertion hole 10b is formed in a long hole shape along the outer peripheral edge of the stack 10. As illustrated in FIG. 2, the magnet insertion hole 10b extends along a stacking direction, and passes through the stack 10. Further, the number of magnet insertion holes 10b, the position and the shape thereof may be changed in accordance with an application and a particular function of the motor.

The permanent magnet 12 is inserted in the magnet insertion hole 10b. In the magnet insertion hole 10b, one permanent magnet 12 may be inserted, or the plurality of permanent magnets 12 may be inserted. The plurality of permanent magnets 12 may be arranged in the stacking direction in the magnet insertion hole 10b, may be arranged in a circumferential direction of the stack 10, or may be arranged in a radial direction. The type of the permanent magnet 12 may be determined in accordance with an application and a particular performance of the motor. For example, the permanent magnet 12 may be a sintered magnet or a bonded magnet.

The resin material 14 fills the magnet insertion hole 10b in which the permanent magnet 12 is inserted. The resin material 14 has a function of fixing the permanent magnet 12 to the magnet insertion hole 10b, and a function of bonding the blanked members 3 adjacent to each other in the stacking direction. Examples of the resin material 14 include a thermosetting resin. Specific examples of the thermosetting resin include a resin composition which contains an epoxy resin, a hardening initiator, and an additive. Examples of the additive include a filler, a flame retardant, and a stress reducing agent. Further, other types of resin material that can fill the magnet insertion hole 10b may be used as the resin material. For example, the resin material 14 may be a thermoplastic resin.

The swaged portion 16 engages the blanked members 3 which are adjacent to each other in the stacking direction of the blanked member 3 (hereinafter, simply referred to as "the stacking direction"). Further, a method of engaging the blanked members 3 is not limited to swaging. For example, the plurality of blanked members 3 may be bonded to each other using an adhesive or a resin material, or may be bonded to each other by welding.

The ID code 18 is provided in a surface 10d (upper surface or lower surface) of the stack 10. The ID code 18 stores information in accordance with the type of the stack 10 of the motor core 1 which includes the ID code 18. Examples of information in accordance with the type include type identification information and a manufacturing condition in accordance with the type. For example, the ID code 18 may store individual information of the motor core 1 which includes the ID code 18. The ID code 18 may further store a product type, a manufacturing date, and/or a manufacturing line of the motor core 1, in addition to the information in accordance with the type of the stack 10.

The ID code 18 is configured to be read by a predetermined device (for example, reading devices 25A, 25B, and 25C described below). The ID code 18 may be configured by a combination of a light pattern and a dark pattern for example. Examples of the ID code 18 include a barcode or a two-dimensional code. Examples of the two-dimensional code include QR code (registered trademark), DataMatrix, and Vericode. In addition, the ID code 18 may be a visually readable indication.

(Manufacturing Device of Stacked Core)

Figure 3:
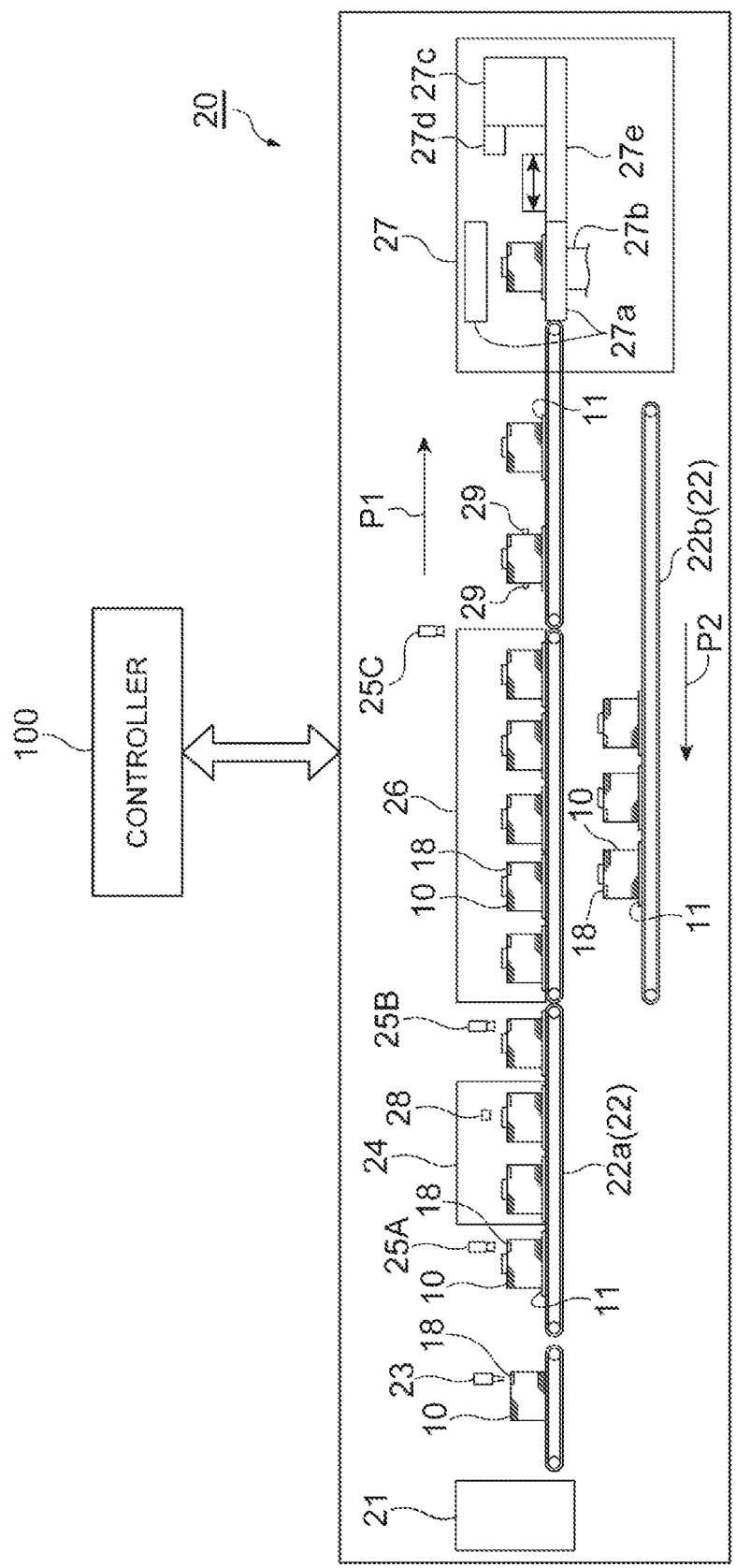
FIG. 3 is a schematic diagram illustrating an example manufacturing device of the stacked core.

Next, an example manufacturing device of the stacked core will be described with reference to FIG. 3. The manufacturing device 20 illustrated in FIG. 3 is a device for manufacturing the motor core 1. The manufacturing device 20 manufactures plural types of motor cores 1. Examples of the motor core 1 include a motor core for driving and a motor core for power generating. The manufacturing device 20 includes a press device 21, a conveyance device 22, a laser device 23 (marking device), a magnet inserting device 24, the reading devices 25A, 25B, and 25C, a pre-heating device 26, a mold device 27, sensors 28 and 29, and a controller 100 (control module).

The press device 21 has a function of blanking the electrical steel sheet W received from the upstream process to form the blanked member 3, and a function of stacking the blanked members 3 which are obtained by the blanking process. The press device 21 repeatedly performs the blanking process and the stacking process based on a stacking condition of the plural types so as to form a number of different types (for example, three types) of stacks 10.

The types of stacks 10 include a plurality of stacks which are different from each other in dimension. Examples of the different types of stacks 10 include a first stack 10A, a second stack 10B in which the height of the magnet insertion hole 10b is different from that of the first stack 10A, and a third stack 10C in which the position of the magnet insertion hole 10b is different from that of the one first stack 10A. The second stack 10B may include a larger number of blanked members 3 as compared to that of the first stack 10A. Additionally, a distance from the center of the third stack 10C up to the magnet insertion hole 10b is small compared to that of the first stack 10A. For example, the outer diameter of the blanked member 3 of the third stack 10C is smaller than the outer diameter of the blanked member 3 of the first stack 10A. Further, the plural types of stacks 10 may be formed to have the same dimension. The types of stacks 10 may be manufactured by different materials.

The press device 21 periodically forms three types of stacks 10 in the same order. The press device 21 discharges the formed stack 10 to the conveyance device 22.

The conveyance device 22 conveys the stack 10 received from the press device 21 in the state of being mounted on a cull plate 11. The conveyance device 22 includes conveyors 22a and 22b. The conveyor 22a conveys the stack 10 in a first conveyance direction P1.

The conveyor 22b conveys the stack 10 in a second conveyance direction P2. The first conveyance direction P1 is a direction from the press device 21 sequentially toward the laser device 23, the reading device 25A, the magnet inserting device 24, the reading device 25B, the pre-heating device 26, the reading device 25C, and the mold device 27. The second conveyance direction P2 is a an opposite direction to the conveyance direction P1.

The conveyance device 22 further has a function of switching between a state in which the conveyor 22a conveys the stack 10 and a state in which the conveyor 22b conveys the stack 10. Further, the conveyance device 22 may not include the conveyor 22b, or may have a function of removing the stack 10 from the conveyor 22a instead of the function of switching between the conveyance by the conveyor 22a and the conveyance by the conveyor 22b.

The laser device 23 is provided on the upper side of the conveyor 22a in the downstream side from the press device 21. The laser device 23 emits a laser beam on to the stack 10 when the stack 10 conveyed by the conveyor 22a passes by the lower side of the laser device 23 so as to form the ID code 18 in the surface 10d of the stack 10.

The reading device 25A is provided on the upper side of the conveyor 22a in the downstream side from the laser device 23. The reading device 25A is configured by an image pickup device which includes a camera such as a CCD camera. The reading device 25A captures an image of the ID code 18 when the stack 10 conveyed by the conveyor 22a passes by the lower side of the reading device 25A.

The magnet inserting device 24 is disposed in the downstream side from the reading device 25A. The magnet inserting device 24 inserts the permanent magnet 12 to each magnet insertion hole 10b of the stack 10 by a magnet inserting robot (not illustrated). The magnet inserting device 24 may insert one permanent magnet 12 to one magnet insertion hole 10b, or may insert the plurality of permanent magnets 12 into one magnet insertion hole 10b. The permanent magnets 12 may be arranged in the magnet insertion hole 10b in the stacking direction, may be arranged in the circumferential direction of the stack 10, or may be arranged in the radial direction. The sensor 28 is disposed in the magnet inserting device 24. The sensor 28 measures the height of the permanent magnet 12 which is inserted into the magnet insertion hole 10b.

The reading device 25B is provided on the upper side of the conveyor 22a in the downstream side from the magnet inserting device 24. The reading device 25B may be configured similarly to the reading device 25A. For example, the reading device 25B may be configured by an image pickup device which includes a camera such as a CCD camera. The reading device 25B captures an image of the ID code 18 when the stack 10 conveyed by the conveyor 22a passes by the lower side of the reading device 25B.

The pre-heating device 26 is disposed in the downstream side from the reading device 25B. The pre-heating device 26 pre-heats the stack 10 which is conveyed by the conveyance device 22. The pre-heating device 26 heats the stack 10 using a heated gas or a heater such that the temperature of the stack 10 is suitable for filling with the resin material 14. The temperature is, for example, 140° C. to 185° C., preferably 160° C. to 175° C. The pre-heating device 26 can store a plurality of stacks 10 at the same time, and pre-heats each stack 10 while sending the stack from the upstream side to the downstream side.

The reading device 25C is provided on the upper side of the conveyor 22a in the downstream side from the pre-heating device 26.

The reading device 25C may be configured similarly to the reading devices 25A and 25B. For example, the reading device 25C may be configured by an image pickup device which includes a camera such as a CCD camera. The reading device 25C captures an image of the ID code 18 when the stack 10 conveyed by the conveyor 22a passes by the lower side of the reading device 25C.

The sensor 29 is disposed in the downstream side from the reading device 25C. The sensor 29 measures a temperature of the stack 10 which is carried out from the pre-heating device 26. As the sensor 29, a contact type sensor such as a thermocouple thermometer may be used, or a non-contact type sensor to measure, for example, an infrared ray emitted from the stack 10 may be used.

The mold device 27 has a resin sealing function of filling the magnet insertion hole 10b of the stack 10 with the resin material 14. The mold device 27 includes a mold press 27a, an extrusion mechanism 27b, an arrangement mechanism 27c, a stocker 27d, and a transfer mechanism 27e.

Figure 4:
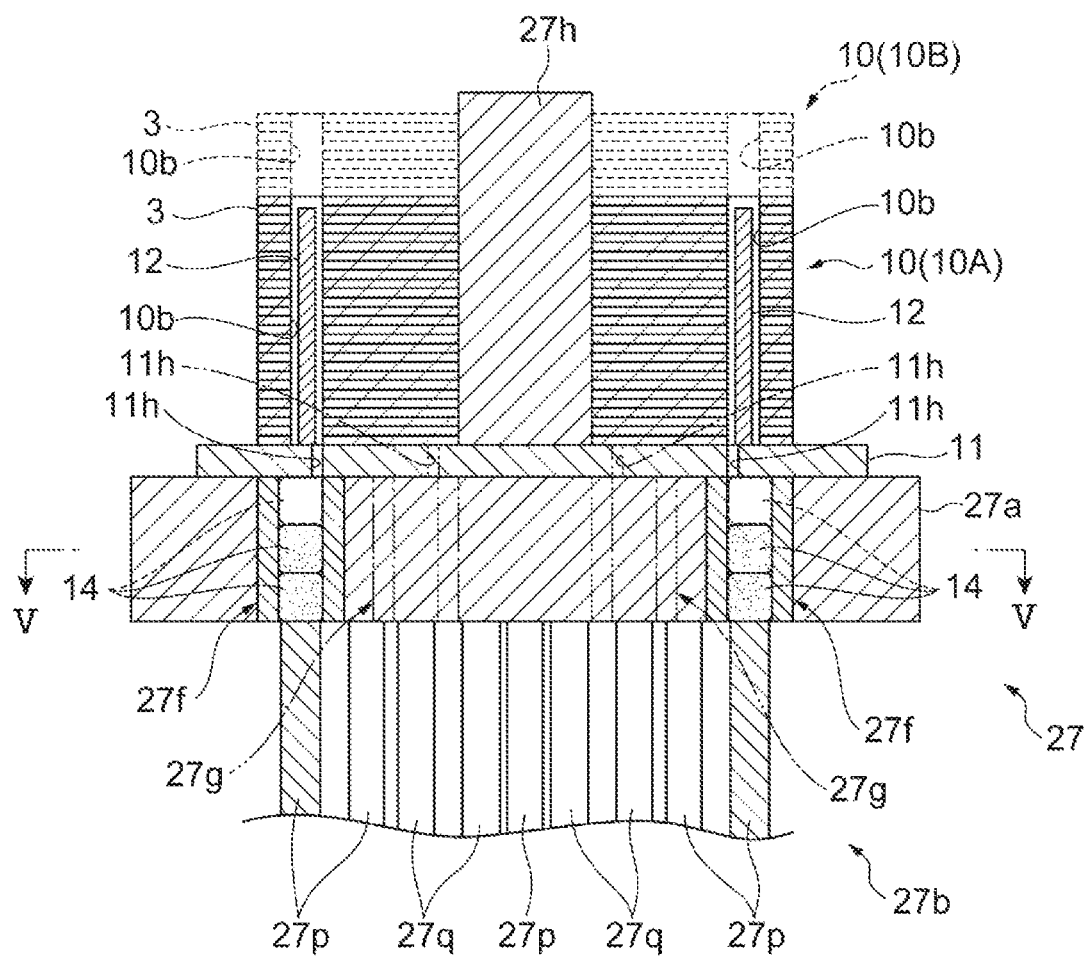
FIG. 4 is a cross-sectional view illustrating a stack and a mold press.
Figure 5:
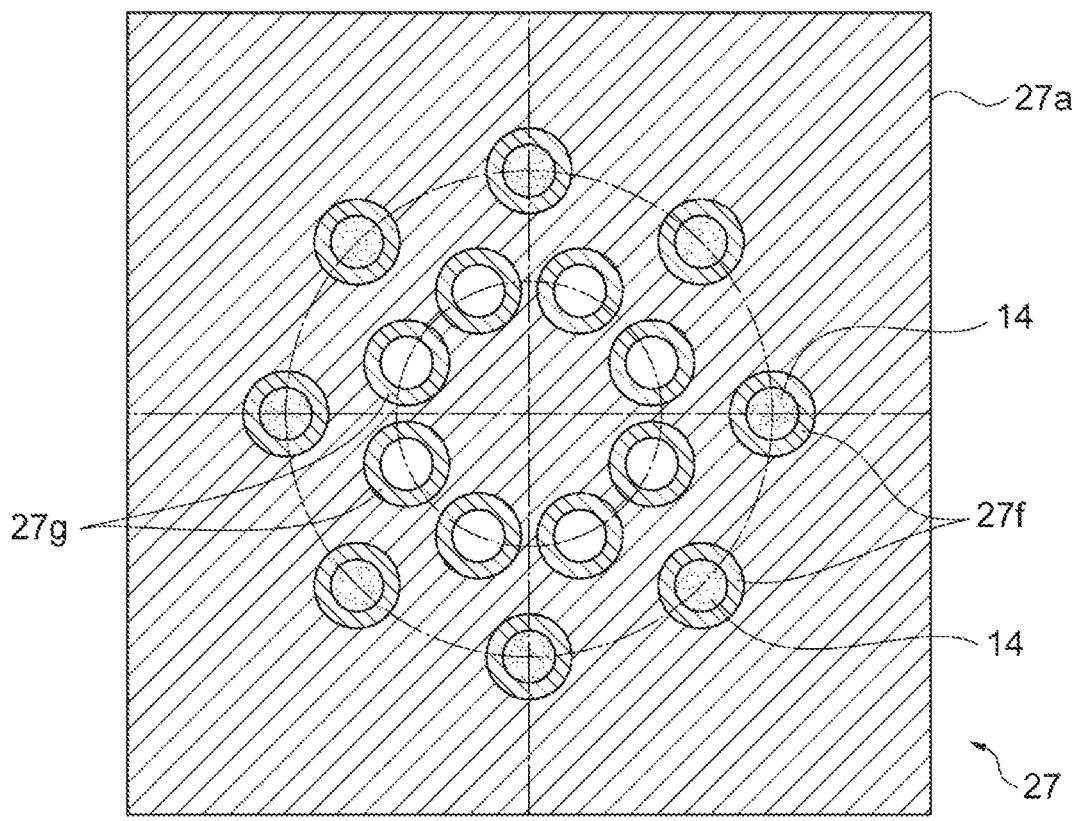
FIG. 5 is a cross-sectional view taken along line V-V in FIG. 4.
Figure 6:
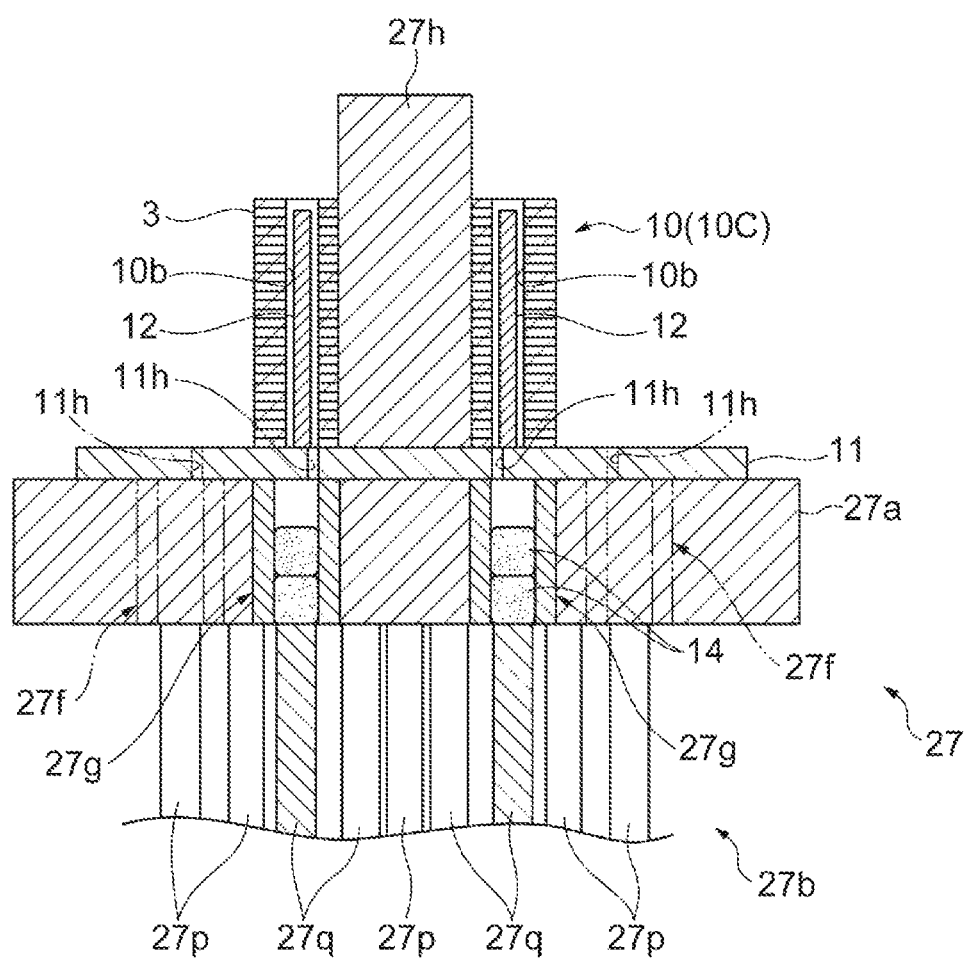
FIG. 6 is a cross-sectional view illustrating the stack and the mold press.

The mold press 27a supports the stack 10 conveyed from the pre-heating device 26 by the conveyor 22a. The mold press 27a includes a plurality of resin reservoir pots which contain the resin material 14 to be injected to the magnet insertion hole 10b of the stack 10. The mold press 27a is configured to change an amount of the resin material 14 and a discharge position (a position of the using resin reservoir pot) of the resin material 14. For example, as illustrated in FIGS. 4 to 6, the mold press 27a is a mold which includes a columnar portion 27h, a plurality (for example, eight) of resin reservoir pots 27f, and a plurality (for example, eight) of resin reservoir pots 27g. The resin reservoir pots 27f and 27g are provided to pass through the mold press 27a in a thickness direction of the mold press 27a. The inner volumes of the resin reservoir pots 27f and 27g are, for example, set in accordance with the stack 10 which has the largest injection amount of the resin material 14 used to fill the magnet insertion hole 10b among the plural types of stacks 10. Specifically, the inner volumes of the resin reservoir pots 27f and 27g are set in accordance with the injection amount of the resin material 14 used to fill the magnet insertion hole 10b of the stack 10B.

The resin reservoir pots 27f and 27g correspond to the plural types of stacks 10 which have different layouts of the magnet insertion hole 10b. For example, the resin reservoir pot 27f is provided at a position corresponding to the magnet insertion hole 10b of the stacks 10A and 10B among the stacks 10A, 10B, and 10C. The resin reservoir pot 27g is provided at a position corresponding to the magnet insertion hole 10b of the stack 10C.

One resin reservoir pot 27f communicates with one magnet insertion hole 10b of the stacks 10A and 10B through an insertion hole 11h which is formed in the cull plate 11. In addition, one resin reservoir pot 27g communicates with one magnet insertion hole 10b of the stack 10C through the insertion hole 11h which is formed in the cull plate 11.

Further, the position corresponding to the magnet insertion hole 10b may be located right below the magnet insertion hole 10b, or may not be located right below the magnet insertion hole 10b. The position corresponding to the magnet insertion hole 10b may be a position communicating with one magnet insertion hole 10b through one insertion hole 11h.

The extrusion mechanism 27b includes a plurality of plungers to extrude the resin material 14 disposed in each resin reservoir pot of the mold press 27a toward the magnet insertion hole 10b. For example, the extrusion mechanism 27b includes a plurality (for example, eight) of plungers 27p and a plurality (for example, eight) of plungers 27q. The plunger 27p extrudes the resin material 14 disposed in the resin reservoir pot 27f toward the magnet insertion hole 10b of the stack 10 (herein, the magnet insertion holes 10b of the stacks 10A and 10B). With this configuration, the resin material 14 disposed in the resin reservoir pot 27f is discharged from the resin reservoir pot 27f, and injected to the magnet insertion hole 10b. The plunger 27q extrudes the resin material 14 disposed in the resin reservoir pot 27g toward the magnet insertion hole 10b of the stack 10 (herein, the magnet insertion hole 10b of the stack 10C). With this configuration, the resin material 14 disposed in the resin reservoir pot 27g is discharged from the resin reservoir pot 27g, and injected into the magnet insertion hole 10b.

For example, in a case where the resin material 14 is injected into the magnet insertion hole 10b of the stack 10A, as illustrated in FIGS. 4 and 5, two resin materials 14 are disposed in each resin reservoir pot 27f of the mold press 27a. In addition, in a case where the resin material 14 is injected into the magnet insertion hole 10b of the stack 10B, another resin material 14 as well as the resin materials 14 of the case of the stack 10A (that is, three resin materials 14 in total) is disposed in each resin reservoir pot 27f of the mold press 27a (a broken line of FIG. 4). In addition, in a case where the resin material 14 is injected into the magnet insertion hole 10b of the stack 10C, as illustrated in FIG. 6, two resin materials 14 are disposed in each resin reservoir pot 27g of the mold press 27a.

Returning to FIG. 3, the arrangement mechanism 27c, the stocker 27d, and the transfer mechanism 27e dispose the resin material 14 in the mold press 27a in accordance with a mold condition (described below) which is set in accordance with the types of the stack 10. The stocker 27d stores a plural types of resin materials 14. The arrangement mechanism 27c includes a part feeder (not illustrated) which sends the resin material 14 from the inside of the stocker 27d, and a robot arm (not illustrated) which takes out the resin material 14 from the part feeder and disposes the resin material 14. The transfer mechanism 27e transfers the resin material 14 from the arrangement mechanism 27c up to the mold press 27a using a linear actuator, for example, as a power source. The extrusion mechanism 27b extrudes the resin material 14 disposed in the mold press 27a toward the magnet insertion hole 10b of the stack 10.

The controller 100 is configured to perform control on the press device 21, the conveyance device 22, the laser device 23, the magnet inserting device 24, the reading devices 25A, 25B, and 25C, the pre-heating device 26, and the mold device 27.

Figure 7:
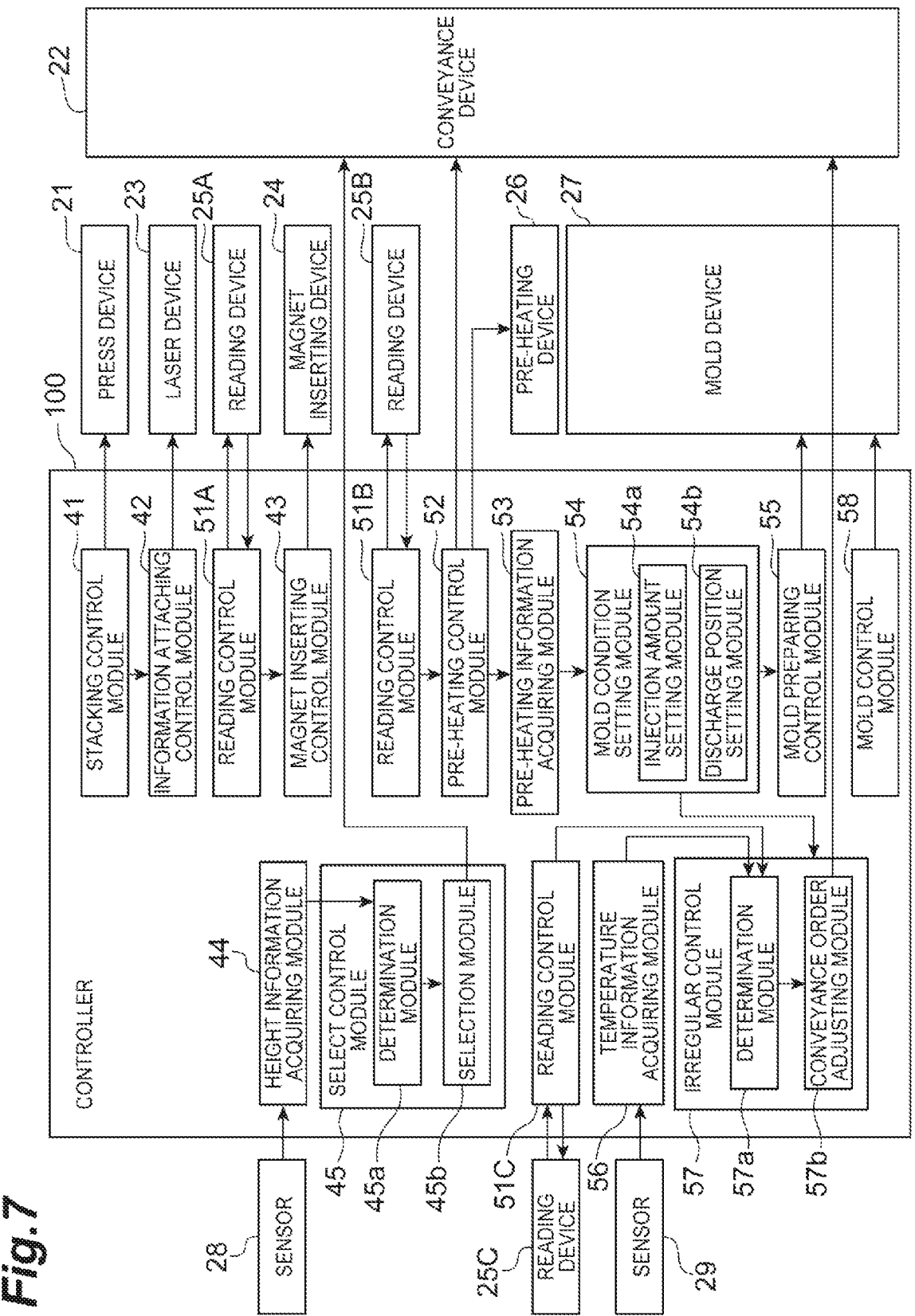
FIG. 7 is a block diagram illustrating a functional configuration of a controller.

FIG. 7 is a block diagram illustrating a functional configuration of the controller 100 (hereinafter, referred to as a "functional module").

The controller 100 includes a stacking control module 41 and an information attaching control module 42 as functional modules to form the stack 10. In addition, the controller 100 includes a reading control module 51A, a magnet inserting control module 43, a height information acquiring module 44, and a select control module 45 as functional modules to insert the permanent magnet 12 into the magnet insertion hole 10b of the stack 10. In addition, the controller 100 includes a reading control module 51B, a pre-heating control module 52, a pre-heating information acquiring module 53, a mold condition setting module 54, a mold preparing control module 55, a reading control module 51C, a temperature information acquiring module 56, an irregular control module 57, and a mold control module 58 as functional modules to fill the magnet insertion hole 10b with the resin material 14.

The stacking control module 41 controls the press device 21 such that the blanked members 3 are repeatedly blanked from the electrical steel sheet W received from the upstream process and stacked so as to form the stack 10. The press device 21 is controlled to periodically form the plural types of stacks 10 (herein, the stacks 10A, 10B, and 10C as three types of stacks 10) in the same order in accordance with a predetermined manufacturing condition, and to periodically discharge the formed stacks 10 in the corresponding order. The conveyor 22a is controlled to periodically convey the plural types of stacks 10 to the pre-heating device 26 in the same order. In other words, the stacking control module 41 indirectly controls the press device 21 to periodically convey three types of stacks 10A, 10B, and 10C in this order to the pre-heating device 26.

Further, the periodic conveying of the plurality of types of stacks 10 in the same order does not mean that all the stacks 10 are periodically conveyed in the same order, but means that at least some of the plurality of stacks 10 are periodically conveyed in the same order.

The information attaching control module 42 acquires, from the stacking control module 41, information on the stack 10 formed by the press device 21 and information indicating that the stack 10 is discharged from the press device 21, and controls the laser device 23 to attach the ID code 18 to the stack 10 which is discharged from the press device 21. The information attaching control module 42 is controlled to attach the ID code 18 containing the information in accordance with the type to the stack 10 based on the information acquired from the stacking control module 41. Specifically, the information attaching control module 42 controls the information attaching control module 42 to attach the ID code 18 containing the information in accordance with the type of each of the stacks 10A, 10B, and 10C based on the information acquired from the stacking control module 41.

The reading control module 51A controls the reading device 25A to read out the information contained in the ID code 18 of the stack 10 attached with the ID code 18. The reading device 25A is controlled to capture an image of the ID code 18 of the stack 10 by a camera before the permanent magnet 12 is inserted into the magnet insertion hole 10b of the conveying target stack 10, and to acquire the captured image.

The magnet inserting control module 43 controls the magnet inserting device 24 to insert the permanent magnet 12 into each magnet insertion hole 10b of the stack 10 attached with the ID code 18. The magnet inserting device 24 is controlled to set a magnet inserting condition based on the information acquired from the reading control module 51A (the information of the ID code 18 in accordance with the type of the stack 10) and to insert the permanent magnet 12 to the magnet insertion hole 10b in accordance with the condition.

For example, the magnet inserting control module 43 may refer to a table (not illustrated) associating the type identification information of the stack 10 with the manufacturing condition suitable to each type, and may control the magnet inserting device 24 to insert the permanent magnet 12 to the magnet insertion hole 10b in accordance with the type indicated by the ID code 18. The magnet inserting control module 43 may control the magnet inserting device 24 to insert one permanent magnet 12 into the magnet insertion hole 10b, or may control the magnet inserting device 24 to insert the plurality of permanent magnets 12. In a case where the plurality of permanent magnets 12 are inserted into the magnet insertion hole 10b, the magnet inserting control module 43 may control the magnet inserting device 24 such that the plurality of permanent magnets 12 are arranged in the stacking direction of the stack 10, may control the magnet inserting device 24 such that the plurality of permanent magnets 12 are arranged in the circumferential direction of the stack 10, or may control the magnet inserting device 24 such that the plurality of permanent magnets 12 are arranged in the radial direction of the stack 10.

The height information acquiring module 44 acquires the height information of the permanent magnet 12 in the magnet insertion hole 10b which is measured by the sensor 28 after the permanent magnet 12 is inserted.

The select control module 45 selects the stack 10 to be conveyed to the reading device 25B based on the height of the permanent magnet 12 in the magnet insertion hole 10b of the stack 10 where the permanent magnet 12 is completely inserted. The select control module 45 includes a determination module 45a and a selection module 45b.

The determination module 45a determines whether the height of the permanent magnet 12 of the stack 10 where the permanent magnet 12 is completely inserted falls within a predetermined range based on the information acquired from the height information acquiring module 44. The predetermined range is set to a range obtained on an assumption that the permanent magnet 12 is normally inserted in the magnet insertion hole 10*b*.

In a case where the determination module 45*a* determines that the height of the stack 10 falls within the predetermined range, the selection module 45*b* controls the conveyance device 22 to convey the stack 10 from the magnet inserting device 24 to the reading device 25B. On the other hand, in a case where the determination module 45*a* determines that the height of the stack 10 falls out of the predetermined range, the selection module 45*b* removes the stack 10 from a group of stacks to be conveyed to the reading device 25B. Specifically, the selection module 45*b* controls the conveyance device 22 to switch the conveyance of the stack 10 from the conveyance by the conveyor 22*a* to the conveyance by the conveyor 22*b*.

The reading control module 51B controls the reading device 25B to read out the information contained in the ID code 18 of the conveyed stack 10. The control includes controlling the reading device 25B to capture an image of the ID code 18 of the stack 10 by a camera before the conveying target stack 10 is conveyed to the pre-heating device 26, and acquiring the captured image.

The pre-heating control module 52 controls the pre-heating device 26 to pre-heat the stack 10 which is not yet filled with the resin material 14. In other words, the pre-heating device 26 is controlled to perform before the mold control module 58 (described below).

Specifically, the pre-heating control module 52 acquires, from the reading control module 51B, the information contained in the ID code 18 of the stack 10 sent from the upstream side, controls the conveyance device 22 to convey the stack 10 to the pre-heating device 26, and controls the pre-heating device 26 to heat the stack 10 using a gas or a heater while moving the stack 10 at a predetermined speed.

The pre-heating information acquiring module 53 acquires, from the pre-heating control module 52, the information contained in the ID code 18 of the stack 10 and information on progress of pre-heating the stack 10 in association with each other. For example, the pre-heating information acquiring module 53 acquires, from the pre-heating control module 52, information indicating a position in the pre-heating device 26 of the stack 10 as the information on progress of pre-heating the stack 10. Specifically, the pre-heating information acquiring module 53 acquires, from the pre-heating control module 52, an elapsed time after the stack 10 is conveyed to the pre-heating device 26 and a moving speed of the stack 10, and derives the position of the stack 10 based on these pieces of information.

The mold condition setting module 54 acquires, from the pre-heating information acquiring module 53, the information indicating progress of pre-heating the stack 10 by the pre-heating device 26, and sets the mold condition suitable to the stack 10 in accordance with the progress of pre-heating the stack 10 by the pre-heating device 26. Further, the setting of the condition in accordance with the progress means that the setting is performed when the progress reaches a predetermined stage. For example, the mold condition setting module 54 refers a table associating the type identification information of the stack 10 with the manufacturing condition suitable to each type, and sets the mold condition in accordance with the type indicated in the ID code 18 of the stack 10 of which the progress of pre-heating reaches a predetermined stage.

Before one stack 10 is completely pre-heated by the pre-heating device 26, the mold condition setting module 54 may set the mold condition for the subject stack 10. Specifically, the mold condition setting module 54 sets the mold condition suitable to the stack 10 when the position of the stack 10 reaches a position before the stack is carried out from the pre-heating device 26 (for example, a position second to the upstream side from the stack 10 right before being carried out).

Further, a sensor may be disposed to detect whether the stack 10 passes through a predetermined position in the pre-heating device 26 in order to specify a timing of setting the mold condition. In this case, for example, the pre-heating information acquiring module 53 acquires a detection result of the sensor. When the pre-heating information acquiring module 53 detects a result that the stack 10 passes through the sensor, the mold condition setting module 54 sets the mold condition.

The mold condition includes at least one of a type of the resin material 14 to be injected to the magnet insertion hole 10*b* of the stack 10 of the target, an injection amount of the resin material 14, and the discharge position of the resin material 14. For example, the mold condition includes the injection amount of the resin material 14 and the discharge position of the resin material 14. For this reason, the mold condition setting module 54 includes an injection amount setting module 54*a* and a discharge position setting module 54*b*. The injection amount setting module 54*a* specifies a height of the magnet insertion hole 10*b* of the stack 10 attached with the ID code 18 based on the information contained in the ID code 18, and sets the injection amount of the resin material 14 in accordance with the height of the magnet insertion hole 10*b*. The discharge position setting module 54*b* specifies a position of the magnet insertion hole 10*b* of the stack 10 attached with ID code 18 based on the information of the ID code 18, and sets the discharge position of the resin material 14 in accordance with the position of the magnet insertion hole 10*b*.

For example, in a case where the mold condition for the stack 10A is specified by the ID code 18, the injection amount setting module 54*a* sets two resin materials 14 to be injected, and the discharge position setting module 54*b* sets the resin material 14 to be injected from each resin reservoir pot 27*f* of the mold press 27*a* (see FIGS. 4 and 5). In addition, in a case where the mold condition for the stack 10B is specified by the ID code 18, the injection amount setting module 54*a* sets three resin materials 14 to be injected, and the discharge position setting module 54*b* sets the resin material 14 to be injected from each reservoir pot 27*f* of the mold press 27*a*. In addition, in a case where the mold condition for the stack 10C is specified by the ID code 18, the injection amount setting module 54*a* sets two resin materials 14 to be injected, and the discharge position setting module 54*b* sets the resin material 14 from each resin reservoir pot 27*g* of the mold press 27*a* to be injected (see FIG. 6).

The mold preparing control module 55 controls the mold device 27 to prepare the resin material 14 in accordance with the mold condition set by the mold condition setting module 54. The control is performed in synchronization with the timing when the stack 10 for which the mold condition is set reaches the mold device 27. In some examples, the control is not performed at the timing when the stack 10 reaches the mold device 27, but may also be performed a certain period of time of before or after the timing.

The reading control module 51C controls the reading device 25C to read out the information contained in the ID code 18 of the stack 10 which is pre-heated by the pre-heating device 26. The reading device 25C is controlled to capture an image of the ID code 18 of the stack 10 by a camera before the temperature of the stack 10 carried out from the pre-heating device 26 is measured, and to acquire the captured image.

The irregular control module 57 performs a first determination on whether the stack 10 can be conveyed to the mold device 27 based on the type of the stack 10 specified by the ID code 18 which is pre-heated by the pre-heating device 26 (hereinafter, referred to as "the type of the stack 10 after the pre-heating"), performs a second determination on whether the stack 10 can be conveyed to the mold device 27 based on the temperature of the stack 10, and performs an adjustment of a conveyance order of the stack 10 based on the results of the first and second determinations. The irregular control module 57 includes a determination module 57a and a conveyance order adjusting module 57b.

The determination module 57a performs the first and second determinations. In the first determination, the determination module 57a determines whether the type of the stack 10 after the pre-heating is equal to the type of the stack 10 corresponding to the mold condition set by the mold condition setting module 54 (hereinafter, referred to as "the type of the stack 10 set up with the mold condition") based on information acquired from the reading control module 51C. In a case where the type of the stack 10 after the pre-heating is equal to the type of the stack 10 set up with the mold condition, the determination module 57a determines that the stack 10 can be conveyed to the mold device 27. On the other hand, in a case where the type of the stack 10 after the pre-heating is not equal to the type of the stack 10 set up with the mold condition, the determination module 57a determines that the stack 10 cannot be conveyed to the mold device 27.

In the second determination, the determination module 57a determines whether the temperature of the stack 10 pre-heated by the pre-heating device 26 falls within a predetermined range based on information acquired from the temperature information acquiring module 56. The predetermined range of temperature is set such that the temperature at the time of filling with the resin material 14 is set to be a temperature suitable to fill with the resin material 14. The predetermined range of temperature is set to, for example, 140° C. to 185° C., and preferably set to 160° C. to 175° C. In a case where the temperature of the stack 10 falls within the predetermined range, the determination module 57a determines that the stack 10 can be conveyed to the mold device 27. On the other hand, in a case where the temperature of the stack 10 does not fall within the predetermined range, the determination module 57a determines that the stack 10 cannot be conveyed to the mold device 27.

In a case where the result of the first determination acquired from the determination module 57a is that the stack 10 can be conveyed to the mold device 27, the conveyance order adjusting module 57b controls the conveyor 22a to convey the stack 10 to the sensor 29. On the other hand, in a case where the result of the first determination acquired from the determination module 57a is that the stack 10 cannot be conveyed to the mold device 27, the conveyance order adjusting module 57b removes the stack 10 from the group of stacks to be conveyed to the mold device 27 (the sensor 29). Specifically, the conveyance order adjusting module 57b controls the conveyance device 22 to switch the conveyance of the stack 10 from the conveyance by the conveyor 22a to the conveyance by the conveyor 22b.

In addition, in a case where the result of the second determination acquired from the determination module 57a is that the stack 10 can be conveyed to the mold device 27, the conveyance order adjusting module 57b controls the conveyor 22a to convey the stack 10 from the pre-heating device 26 to the mold device 27. On the other hand, in a case where the result of the second determination acquired from the determination module 57a is that the stack 10 cannot be conveyed to the mold device 27, the conveyance order adjusting module 57b removes the pre-heated stack 10 from the group of stacks to be conveyed to the mold device 27 until another stack 10 having the same type as the subject stack 10 is determined to be conveyed to the mold device 27 (hereinafter, referred to as "the irregular process"). Specifically, the conveyance order adjusting module 57b controls the conveyance device 22 to switch the conveyance of the stack 10 from the conveyance by the conveyor 22a to the conveyance by the conveyor 22b.

The mold control module 58 controls the mold device 27 to inject the resin material 14 into the magnet insertion hole 10b in accordance with the mold condition. Specifically, the mold control module 58 controls the mold device 27 to fill the magnet insertion hole 10b of the conveyed stack 10 with the resin material 14 prepared in accordance with the set mold condition.

Figure 8:
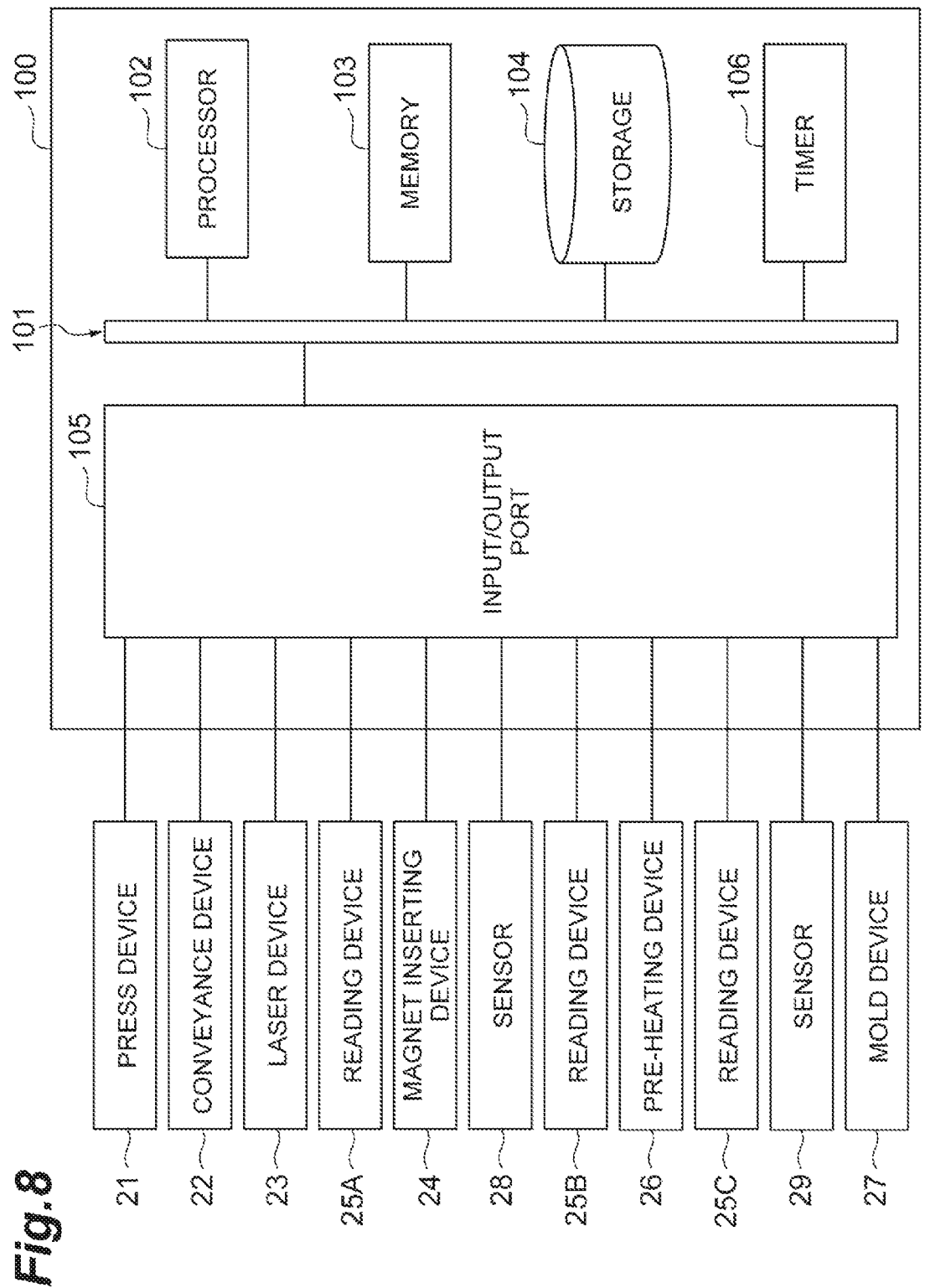
FIG. 8 is a block diagram illustrating an example hardware configuration of the controller.

The controller 100 may include, or may be configured, operated, or controlled by, one or more control computers. For example, as illustrated in FIG. 8, the controller 100 includes circuitry 101. The circuitry 101 includes one or a plurality of processors 102, a memory 103, a storage 104, an input/output port 105, and a timer 106. The input/output port 105 inputs or outputs electrical signals among the press device 21, the conveyance device 22, the laser device 23, the magnet inserting device 24, the reading devices 25A, 25B, and 25C, the pre-heating device 26, the mold device 27, and the sensors 28 and 29. The timer 106 measures an elapsed time by counting reference pulses of a constant period for example.

The storage 104 includes a computer-readable storage medium such as a hard disk. The storage medium stores a program for each functional module. The storage medium may be a detachable medium such as a nonvolatile semi-conductor memory, a magnetic disk, and an optical disk. The memory 103 temporarily stores a program loaded from the storage medium of the storage 104 and a calculation result of the processor 102. The processor 102 executes the program in cooperation with the memory 103 to implement the respective functional modules.

Further, a hardware configuration of the controller 100 is not necessarily limited to the configuration that the respective functional module is implemented by a program. For example, the respective functional modules of the controller 100 may be configured by a dedicated logical circuit or an ASIC (Application Specific Integrated Circuit) in which the logical circuit is integrated.

(Manufacturing Method of Stacked Core)

Next, example processes performed by the manufacturing device 20 in accordance with the control of the controller 100 will be described as an example of the manufacturing method of the stacked core with reference to FIGS. 9 to 11.

(Processing Procedures of Forming Stack and Inserting Magnet)

Figure 9:
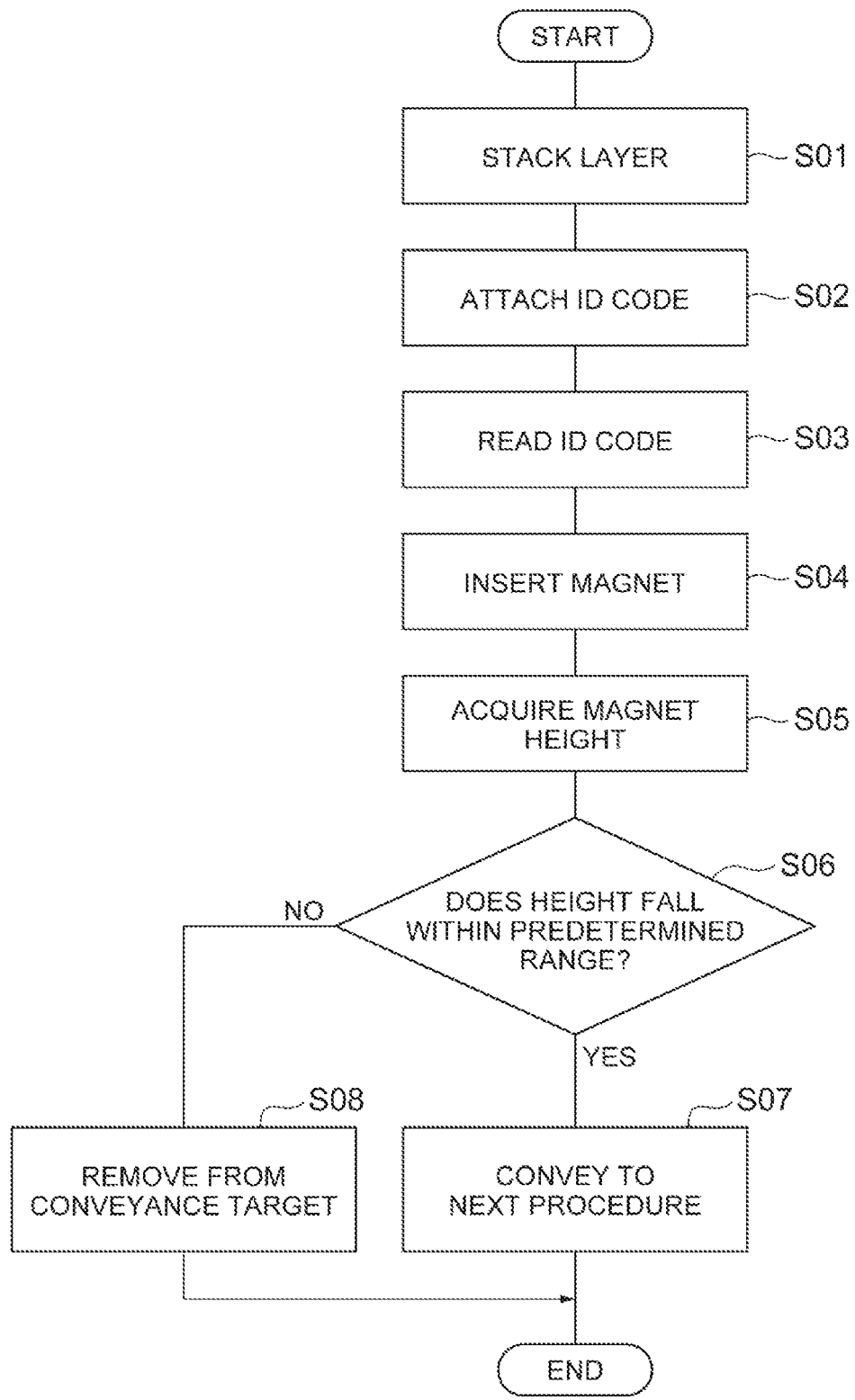
FIG. 9 is a flowchart illustrating an example process of forming the stack and an example process of inserting a magnet.

As illustrated in FIG. 9, the controller 100 performs Steps S01 and S02 sequentially. In Step S01, the stacking control module 41 controls the press device 21 such that the blanked members 3 are repeatedly blanked from the electrical steel sheet W and stacked so as to form the stack 10. In Step S02, the information attaching control module 42 controls the laser device 23 to attach the ID code 18 to the stack 10.

Subsequently, the controller 100 performs Steps S03, S04, S05, and S06 sequentially. In Step S03, the reading control module 51A controls the reading device 25A to read out the ID code 18 attached to the stack 10 to obtain the information contained in the ID code 18. In Step S04, the magnet inserting control module 43 controls the magnet inserting device 24 to insert the permanent magnet 12 to each magnet insertion hole 10b of the stack 10. In Step S05, the height information acquiring module 44 acquires the height information of the permanent magnet 12 in the magnet insertion hole 10b which is measured by the sensor 28. In Step S06, the determination module 45a of the select control module 45 determines whether the height of the permanent magnet 12 of the stack 10 falls within a predetermined range.

In Step S06, in a case where it is determined that the height of the permanent magnet 12 falls within the predetermined range, the controller 100 performs Step S07. In Step S07, the selection module 45b of the select control module 45 controls the conveyance device 22 to convey the stack 10 from the magnet inserting device 24 to the reading device 25B.

On the other hand, in Step S06, in a case where it is determined that the height of the permanent magnet 12 does not fall within the predetermined range, the controller 100 performs Step S08. In Step S08, the selection module 45b of the select control module 45 removes the stack 10 from a group of stacks to be conveyed to the reading device 25B.

(Process of Filling with Resin)

Figure 10:
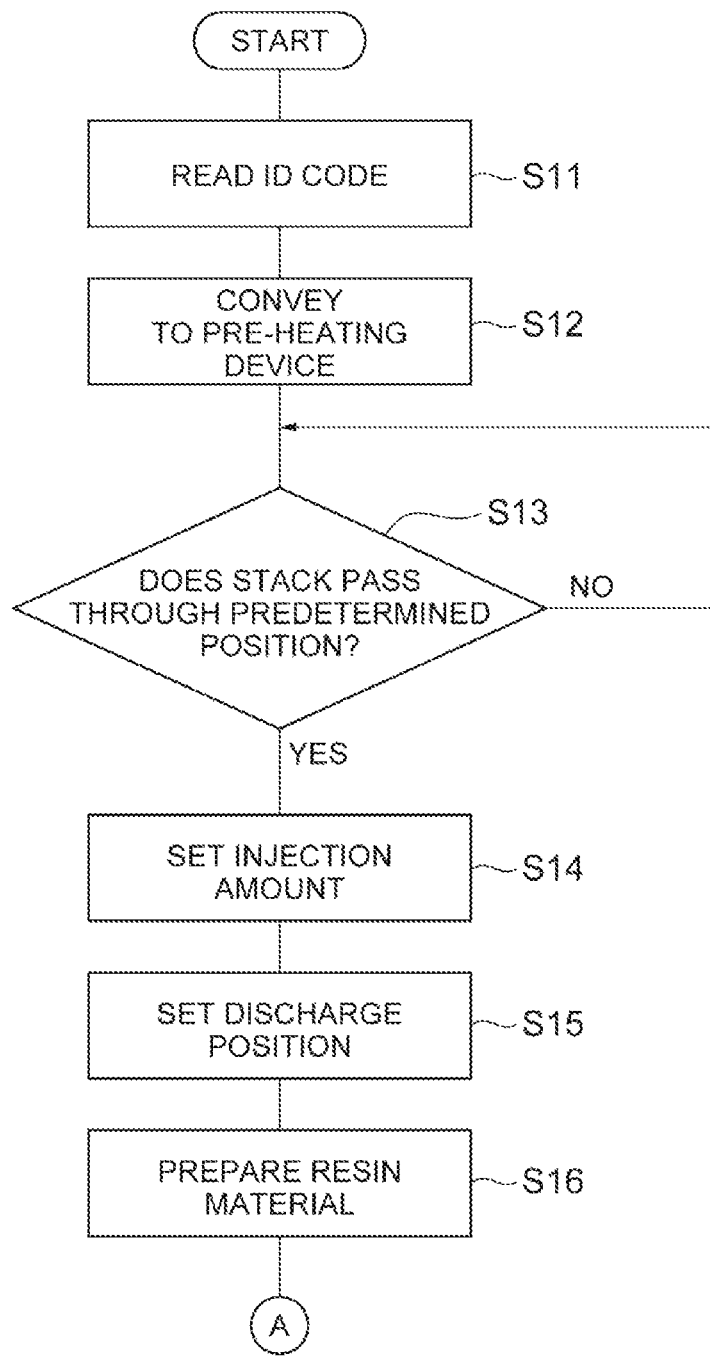
FIG. 10 is a flowchart illustrating an example process of filling with resin.

In the following procedure, as illustrated in FIG. 10, the controller 100 may be configured to perform the steps sequentially; however, in some examples one or more of the steps may be performed in parallel or in a different order. Still further, one or more of the steps may be omitted or performed at a different time or as part of a different process. In Step S11, the reading control module 51B controls the reading device 25B to read out the ID code 18 attached to the stack 10 to obtain the information contained in the ID code 18.

In Step S12, the pre-heating control module 52 controls the conveyance device 22 to convey the stack 10 into the pre-heating device 26. Thereafter, the pre-heating control module 52 controls the pre-heating device 26 to heat the stack 10 using a gas or a heater while moving the stack 10 at a predetermined speed.

In Step S13, the mold condition setting module 54 is on standby until the stack 10 under being pre-heated passes through a predetermined position in the pre-heating device 26. The predetermined position in the pre-heating device 26 is, for example, a position second to the upstream side from the stack 10 right before being carried out.

After the stack 10 passes through the predetermined position in the pre-heating device 26, the mold condition setting module 54 sets the mold condition suitable to the stack 10 which passes through the predetermined position in the pre-heating device 26. For example, the mold condition setting module 54 performs Steps S14 and S15.

In Step S14, the injection amount setting module 54a specifies the height of the magnet insertion hole 10b of the stack 10, and sets an injection amount of the resin material 14 in accordance with the height of the magnet insertion hole 10b. In Step S15, the discharge position setting module 54b specifies the position of the magnet insertion hole 10b of the stack 10, and sets the discharge position of the resin material 14 in accordance with the position of the magnet insertion hole 10b.

As previously discussed, the controller 100 may perform Steps S14 and S15 in order shown, or in a reverse order. In addition, the controller 100 may perform Steps S14 and S15 in parallel.

In Step S16, the mold preparing control module 55 controls the mold device 27 to prepare the resin material 14 in accordance with the set mold condition.

As further illustrated in FIG. 11, the controller 100 performs Step S17. In Step S17, the reading control module 51C is on standby until the stack 10 under being pre-heated is carried out from the pre-heating device 26. In Step S18, the reading control module 51C controls the reading device 25C to read out the ID code 18 attached to the stack 10 to obtain the information contained in the ID code 18.

In Step S19, the determination module 57a of the irregular control module 57 determines whether the stack 10 can be conveyed to the mold device 27 based on the type of the stack 10 after the pre-heating (first determination). In a case where the type of the stack after the pre-heating is equal to the type of the stack 10 set up with the mold condition, the determination module 57a determines that the stack 10 can be conveyed to the mold device 27. On the other hand, in a case where the type of the stack 10 after the pre-heating is not equal to the type of the stack 10 set up with the mold condition, the determination module 57a determines that the stack 10 cannot be conveyed to the mold device 27.

In a case where it is determined in Step S19 that the stack 10 cannot be conveyed (in a case where the type of the stack 10 after the pre-heating is not equal to the type of the stack 10 set up with the mold condition), the controller 100 performs Step S27. In Step S27, the conveyance order adjusting module 57b of the irregular control module 57 removes the stack 10 from a group of stacks to be conveyed to the mold device 27. As above, the controller 100 ends the process. After that, the next stack 10 is removed from a group of stacks to be conveyed to the mold device 27 until the type of the stack 10 after the pre-heating becomes equal to the type of the stack 10 set up with the mold condition.

In a case where it is determined in Step S19 that the stack 10 can be conveyed (in a case where it is determined that the type of the stack 10 after the pre-heating is equal to the type of the stack 10 set up with the mold condition), the controller 100 performs Step S20. In Step S20, the conveyance order adjusting module 57b of the irregular control module 57 controls the conveyance device 22 to convey the stack 10 from the pre-heating device 26 to the sensor 29. The temperature information acquiring module 56 acquires temperature information of the stack 10 which is measured by the sensor 29.

In Step S21, the irregular control module 57 checks the status of the irregular process. The status of the irregular process includes "running" indicating that the above-described irregular process (a process of adjusting an order of conveying the stack 10 in a case where the result of the second determination on the stack 10 is that the stack 10 cannot be conveyed to the mold device 27) is in progress, and "releasing" indicating that the irregular process is not in progress.

In a case where it is determined in Step S21 that the status of the irregular process is "releasing", the controller 100 performs Step S22. In Step S22, the determination module 57a of the irregular control module 57 determines whether the stack 10 can be conveyed to the mold device 27 based on the temperature of the stack 10 (second determination). In a case where the temperature of the stack 10 falls within the predetermined range, the determination module 57a determines that the stack 10 can be conveyed to the mold device 27. On the other hand, in a case where the temperature of the stack 10 does not fall within the predetermined range, the determination module 57a determines that the stack 10 cannot be conveyed to the mold device 27.

In a case where it is determined in Step S22 that the stack 10 can be conveyed (in a case where it is determined that the temperature of the stack 10 falls within a predetermined range), the controller 100 performs Steps S29 and S30. In some examples, Steps S29 an dS30 are performed sequentially. In Step S29, the conveyance order adjusting module 57b of the irregular control module 57 controls the conveyance device 22 to convey the stack 10 from the pre-heating device 26 to the mold device 27.

In Step S30, the mold control module 58 controls the mold device 27 to inject the resin material 14 to the magnet insertion hole 10b in accordance with the mold condition. Then, the injected resin material 14 fills the magnet insertion hole 10b, and one motor core 1 is manufactured.

In a case where it is determined in Step S22 that the stack 10 cannot be conveyed (in a case where it is determined that the temperature of the stack 10 does not fall within the predetermined range), the controller 100 performs Steps S23 and S24. In Step S23, the conveyance order adjusting module 57b changes the status of the irregular process from "releasing" to "running". In Step S24, the conveyance order adjusting module 57b of the irregular control module 57 removes the stack 10 from a group of stacks to be conveyed to the mold device 27. The controller 100 ends the control process on the stack 10. Then, during a period when the status of the irregular process is "running", the irregular process is performed on the next stack 10.

In Step S21, in a case where it is determined that the status of the irregular process is "running", the controller 100 performs Step S25. In Step S25, the conveyance order adjusting module 57b of the irregular control module 57 determines whether the type of the stack 10 after the pre-heating is equal to that of the stack 10 (the stack 10 which is removed from a group of stacks to be conveyed to the mold device 27 when the status of the irregular process is changed to "running") at the time of starting the irregular process. Further, instead of determining whether the type is equal to that of the stack 10 at the time of starting the irregular process, the conveyance order adjusting module 57b of the irregular control module 57 may determine whether the type is equal to that of the stack 10 set up with the mold condition, or may determine whether the type is equal to the stack 10 (the stack 10 corresponding to the mold condition in which the resin material 14 is prepared) for which the mold device 27 is on standby.

In Step S25, in a case where it is determined that the type of the stack 10 after the pre-heating is equal to that of the stack 10 at the time of starting the irregular process, the controller 100 performs Step S26. In Step S26, the determination module 57a of the irregular control module 57 performs the first determination similarly to Step S22.

In a case where it is determined in Step S26 that the stack 10 can be conveyed (in a case where the temperature of the stack 10 falls within the predetermined range), the controller 100 performs Step S28. In Step S28, the irregular control module 57 changes the status of the irregular process from "running" to "releasing".

Thereafter, the controller 100 performs Steps S29 and S30. As discussed above, Steps S29 and S30 may be performed sequentially. Then, as described above, the injected resin material 14 fills the magnet insertion hole 10b, and one motor core 1 is manufactured.

In a case where it is determined in Step S25 that the type of the stack 10 after the pre-heating is not equal to that of the stack 10 at the time of starting the irregular process, or in a case where it is determined in Step S26 that the stack 10 cannot be conveyed (in a case where it is determined that the temperature of the stack 10 does not fall within the predetermined range), the controller 100 performs Step S27 (the conveyance order adjusting module 57b of the irregular control module 57 removes the stack 10 from a group of stacks to be conveyed to the mold device 27). The controller 100 ends the process. Hereinafter, the irregular process is performed on the next stack 10 until the status of the irregular process becomes "releasing".

As described above, the manufacturing method may include attaching the ID code 18 containing the information in accordance with the type of the stack 10 of the blanked member 3 to the stack 10 in which the magnet insertion hole 10b to fill with the resin material 14 is formed, and reading the information from the ID code 18 attached to the stack 10 Additionally, the manufacturing method may comprise setting the mold condition containing at least one of the type of the resin material 14 to be injected to the magnet insertion hole 10b, an injection amount of the resin material 14, and the discharge position of the resin material 14 based on the information read from the ID code 18. The mold device 27 may be controlled to inject the resin material 14 to the magnet insertion hole 10b in accordance with the mold condition.

In some examples, the mold condition in accordance with the type of the stack 10 can be set using the information read from the ID code 18 attached to the stack 10. In addition, the mold device 27 is controlled to inject the resin material 14 into the magnet insertion hole 10b in accordance with each set mold condition. Thus, for example, even in a case where plural types of motor cores 1 are mixed and manufactured, the resin material 14 can conveniently be injected into each stack 10 without changing molds.

The manufacturing method may further include conveying the stack 10 to the pre-heating device 26 before the mold device 27 is controlled to inject the resin material 14 to the magnet insertion hole 10b, and conveying the pre-heated stack 10 from the pre-heating device 26 to the mold device 27. The information is read from the ID code 18 attached to the stack 10 before the stack 10 is conveyed to the pre-heating device 26. The mold condition for the stack 10 is set in accordance with the progress of pre-heating the stack 10 by the pre-heating device 26. The mold device 27 may be controlled to prepare the resin material 14 in accordance with the mold condition for the stack 10 in synchronization with the timing when the stack 10 reaches the mold device 27. Since the mold condition is set in accordance with the progress of pre-heating the stack 10, and the resin material 14 is controlled to be prepared in synchronization with the timing when the stack 10 reaches the mold device 27, the resin material 14 can be injected without delay after being pre-heated. Therefore, the resin material 14 may be injected into the stack 10 while the temperature of the pre-heated stack 10 falls within a temperature range suitable to fill with the resin material 14.

In some examples, the mold device 27 may be controlled to set the mold condition for the stack 10 and to start preparing the resin material 14 in accordance with the mold condition for the stack 10 before the stack 10 is completely pre-heated by the pre-heating device 26. With this configuration, the resin material 14 may be injected without delay after being pre-heated compared to a case where the resin material 14 starts to be prepared after the stack 10 is completely pre-heated.

The manufacturing method may further include determining whether to allow the stack 10 completely pre-heated by the pre-heating device 26 to be conveyed to the mold device 27 based on the temperature of the stack 10. In a case where it is determined that the stack 10 pre-heated by the pre-heating device 26 cannot be conveyed to the mold device 27, the pre-heated stack 10 may be removed from a group of stacks to be conveyed to the mold device 27 until another stack 10 having the same type as that of the subject stack 10 is determined to be allowed to be conveyed to the mold device 27. In response to determining whether the stack 10 can be conveyed to the mold device 27 based on the temperature of the pre-heated stack 10, the stack 10 of which the temperature is not suitable to fill with the resin material 14 can be removed from a target to fill with the resin material 14. In addition, in a case where the subject stack 10 is removed, a stack 10 having a different type from the subject stack 10 is removed from a group of stacks to be conveyed to the mold device 27. Therefore, the mold condition suitable to the stack 10 to be conveyed to the mold device 27 is reliably matched with the mold condition on which the mold device 27 starts preparing.

The manufacturing method may further include periodically conveying the plural types of stacks 10 to the pre-heating device 26 in the same order. With this configuration, the stacks 10 may be selectively or methodically removed from a group of stacks to be conveyed to the mold device 27.

In some examples, such as when a plurality of motor cores 1 having different heights of the magnet insertion holes 10b are mixed and manufactured, the setting of the mold condition based on the information read from the ID code 18 includes specifying the height of the magnet insertion hole 10b in the stack 10, and setting the injection amount of the resin material 14 in accordance with the height of the magnet insertion hole 10b.

In some examples, such as when a plurality of motor cores 1 having different positions of the magnet insertion hole 10b are mixed and manufactured, the setting of the mold condition based on the information read from the ID code 18 may include specifying the position of the magnet insertion hole 10b in the stack 10, and setting the discharge position of the resin material 14 in accordance with the position of the magnet insertion hole 10b.

It is to be understood that not all aspects, advantages and features described herein may necessarily be achieved by, or included in, any one particular example embodiment. Indeed, having described and illustrated various examples herein, it should be apparent that other examples may be modified in arrangement and detail. For example, the manufacturing method of the stacked core and the manufacturing device 20 of the stacked core may be applied to any other manufacturing target as long as the target is a stacked core. The manufacturing method of the stacked core and the manufacturing device 20 of the stacked core are applicable even to the manufacturing of a stacked core having no permanent magnet, and applicable not only to a core for a rotor but also to the manufacturing of a core for a stator.

Some of the examples provided herein have described that the mold condition includes the injection amount of the resin material 14 and the discharge position of the resin material 14. Accordingly, the mold condition setting module 54 may set the injection amount of the resin material 14 and the discharge position of the resin material 14. However, as described above, the mold condition may include at least one type of condition, such as a first condition associated with the resin material 14 to be injected to the magnet insertion hole 10b of the target stack 10, a second condition associated with the injection amount of the resin material 14, and/or a third condition associated with the discharge position of the resin material 14. For this reason, the mold condition setting module 54 may set at least one of these three types of conditions.

For example, the mold condition setting module 54 may set only the injection amount of the resin material 14, or may set only the discharge position of the resin material 14.

Further, examples of the manufacturing device 20 have been provided in which there are mixed plural types of stacked cores having different heights and positions of the resin filling holes. However, in some examples in which there are mixed plural types of stacked cores, only the heights of the resin filling are different, or only the positions of the resin filling holes are different.

In the examples in which only the heights of the resin filling holes are different, the resin reservoir pot 27f and the plunger 27p, or the resin reservoir pot 27g and the plunger 27q may be omitted from the mold device 27 illustrated in FIGS. 4 to 6. In addition, in the controller 100 illustrated in FIG. 7, the discharge position setting module 54b may be omitted. In addition, Step S15 (discharge position setting) may be omitted from the process illustrated in FIG. 10.

In the examples in which only the positions of the resin filling holes are different, the injection amount setting module 54a may be omitted in the controller 100 illustrated in FIG. 7. In addition, Step S14 (injection amount setting) may be omitted from the process illustrated in FIG. 10.

We claim all modifications and variations coming within the spirit and scope of the subject matter claimed herein.

What is claimed is:

1. A manufacturing method of a stacked core, comprising:
    attaching an information storage portion to a stack of electrical steel sheets in which a resin filling hole to fill with a resin material is formed, the information storage portion containing information in accordance with a type of the stack;
    reading the information from the information storage portion attached to the stack;
    conveying the stack to a pre-heating device after the reading the information;
    pre-heating the stack by the pre-heating device after the conveying the stack;
    setting a mold condition based on the information read from the information storage portion during the pre-heating the stack, the mold condition selected from a group of mold conditions consisting of:
        a type of the resin material to be injected to the resin filling hole;
        an injection amount of the resin material; and
        a discharge position of the resin material;
    conveying the pre-heated stack from the pre-heating device to a mold device after the pre-heating the stack; and
    controlling the mold device to provide the resin material to the stack so as to inject the resin material into the resin filling hole based, at least in part, on the set mold condition after the conveying the pre-heated stack from the pre-heating device to the mold device.

2. The manufacturing method of a stacked core according to claim 1,
    wherein the mold condition for the stack is set during the pre-heating the stack in accordance with an amount of progress of the pre-heating the stack by the pre-heating device, and
    wherein the mold device is controlled to prepare the resin material in accordance with the mold condition for the stack in synchronization with a timing when the stack reaches the mold device.

3. The manufacturing method of a stacked core according to claim 2,
wherein controlling the mold device includes:
controlling the mold device to set the mold condition for the stack before the stack is completely pre-heated by the pre-heating device, and controlling the mold device to start preparing the resin material in accordance with the mold condition for the stack.

4. The manufacturing method of a stacked core according to claim 2, further comprising:
determining whether to allow the stack pre-heated by the pre-heating device to be conveyed to the mold device based on a temperature of the stack,
wherein, in response to determining that the stack pre-heated by the pre-heating device is not allowed to be conveyed to the mold device, the pre-heated stack is removed from a group of stacks to be conveyed to the mold device until another stack comprising a same type of stack as that of the pre-heated stack is determined to be allowed to be conveyed to the mold device.

5. The manufacturing method of a stacked core according to claim 2,
wherein a plurality of different types of stacks are periodically conveyed to the pre-heating device in the same order.

6. The manufacturing method of a stacked core according to claim 1,
wherein setting the mold condition based on the information read from the information storage portion includes:
specifying a height of the resin filling hole in the stack; and
setting an injection amount of the resin material in accordance with the height of the resin filling hole.

7. The manufacturing method of a stacked core according to claim 1,
wherein setting the mold condition based on the information read from the information storage portion includes:
specifying a position of the resin filling hole in the stack; and
setting a discharge position of the resin material in accordance with the position of the resin filling hole.

8. The manufacturing method of a stacked core according to claim 1,
wherein two mold conditions are selected from the group of mold conditions, and
wherein the mold device is controlled to inject the resin material to the resin filling hole based on the two selected mold conditions.

9. The manufacturing method of a stacked core according to claim 1,
wherein all three mold conditions are selected from the group of mold conditions, and
wherein the mold device is controlled to inject the resin material to the resin filling hole based on the three selected mold condition.

* * * * *